US009824143B2

(12) United States Patent
Miyashita et al.

(10) Patent No.: US 9,824,143 B2
(45) Date of Patent: Nov. 21, 2017

(54) APPARATUS, METHOD AND PROGRAM TO FACILITATE RETRIEVAL OF VOICE MESSAGES

(75) Inventors: Ken Miyashita, Tokyo (JP); Tomohiko Hishinuma, Kanagawa (JP); Yoshihito Ohki, Tokyo (JP); Ryohei Morimoto, Kanagawa (JP); Junya Ono, Kanagawa (JP)

(73) Assignee: Sony Corporation (JP)

( * ) Notice: Subject to any disclaimer, the term of this patent is extended or adjusted under 35 U.S.C. 154(b) by 359 days.

(21) Appl. No.: 13/539,693

(22) Filed: Jul. 2, 2012

(65) Prior Publication Data

US 2013/0019176 A1   Jan. 17, 2013

(30) Foreign Application Priority Data

Jul. 11, 2011   (JP) ................................ 2011-152712

(51) Int. Cl.
*G10L 15/30* (2013.01)
*G10L 15/26* (2006.01)
(Continued)

(52) U.S. Cl.
CPC .. *G06F 17/30746* (2013.01); *G06F 17/30651* (2013.01); *G10L 15/26* (2013.01); *G10L 15/30* (2013.01); *G10L 2015/221* (2013.01)

(58) Field of Classification Search
CPC ............... G06F 3/167; G06F 17/30646; G06F 17/30651
(Continued)

(56) References Cited

U.S. PATENT DOCUMENTS 6,199,076 B1 * 3/2001 Logan ............... G06F 17/30053
434/319
6,507,643 B1 * 1/2003 Groner ................. H04L 51/066
379/88.14
(Continued)

FOREIGN PATENT DOCUMENTS

CN       201355842 Y      12/2009
GB   WO 2008084211 A2 *  7/2008   ........... G06Q 10/107
(Continued)

OTHER PUBLICATIONS

Chinese Office Action for Application No. 201210230037.4 dated Jul. 5, 2016.

*Primary Examiner* — Nicholas Klicos
(74) *Attorney, Agent, or Firm* — Lerner, David, Littenberg, Krumholz & Mentlik, LLP (57) ABSTRACT

An information processing apparatus includes a display, an input unit, and a controller. The input unit is configured to receive an input of a first keyword from a user. The controller is configured to retrieve first character information including the input first keyword from a database configured to store a plurality of character information items converted from a plurality of voice information items by voice recognition processing, extract a second keyword that is included in the first character information acquired by the retrieval and is different from the first keyword, and control the display to display a list of items including first identification information with which the acquired first character information is identified and the second keyword included in the first character information.

3 Claims, 7 Drawing Sheets (51) Int. Cl.
*G06F 17/27* (2006.01)
*G06F 17/30* (2006.01)
*G10L 15/22* (2006.01)

(58) Field of Classification Search
USPC .......................................................... 715/728
See application file for complete search history.

(56) References Cited

U.S. PATENT DOCUMENTS

| | | | |
|---|---|---|---|
| 8,209,185 B2* | 6/2012 | Claudatos | H04M 3/2218 379/1.02 |
| 8,447,285 B1* | 5/2013 | Bladon et al. | 455/414.4 |
| 8,775,528 B2* | 7/2014 | Takahashi et al. | 709/206 |
| 2002/0138468 A1* | 9/2002 | Kermani | G06F 17/30017 |
| 2002/0147592 A1* | 10/2002 | Wilmot | G06F 17/3061 704/270.1 |
| 2003/0128820 A1* | 7/2003 | Hirschberg et al. | 379/88.14 |
| 2003/0220784 A1* | 11/2003 | Fellenstein | H04M 3/533 704/201 |
| 2004/0192263 A1* | 9/2004 | Tomikawa | H04L 12/5895 455/413 |
| 2005/0069095 A1* | 3/2005 | Fellenstein et al. | 379/88.02 |
| 2005/0195798 A1* | 9/2005 | Kirkland | H04M 3/42221 370/352 |
| 2005/0222985 A1* | 10/2005 | Buchheit et al. | 707/3 |
| 2006/0010217 A1* | 1/2006 | Sood | 709/206 |
| 2006/0143307 A1* | 6/2006 | Codignotto | G06Q 10/107 709/246 |
| 2006/0271365 A1* | 11/2006 | Maes | G10L 15/22 704/254 |
| 2006/0277210 A1* | 12/2006 | Starbuck | 707/102 |
| 2007/0081636 A1* | 4/2007 | Shaffer | G06Q 10/107 379/80 |
| 2007/0208570 A1* | 9/2007 | Bhardwaj | H04M 3/51 704/270.1 |
| 2008/0043943 A1* | 2/2008 | Sipher | G06Q 10/107 379/88.22 |
| 2008/0057911 A1* | 3/2008 | Lauper | 455/412.1 |
| 2009/0003540 A1* | 1/2009 | Zafar | H04M 1/72547 379/88.11 |
| 2009/0030919 A1* | 1/2009 | Brezina et al. | 707/100 |
| 2009/0097493 A1* | 4/2009 | Patil et al. | 370/412 |
| 2009/0132706 A1* | 5/2009 | Blythe | 709/225 |
| 2009/0141875 A1* | 6/2009 | Demmitt et al. | 379/88.14 |
| 2009/0210778 A1* | 8/2009 | Kulas et al. | 715/201 |
| 2009/0276215 A1* | 11/2009 | Hager | 704/235 |
| 2009/0319504 A1* | 12/2009 | Alberth et al. | 707/5 |
| 2010/0125791 A1* | 5/2010 | Katis | H04M 3/42221 715/716 |
| 2010/0138292 A1* | 6/2010 | Park et al. | 705/14.46 |
| 2010/0145939 A1* | 6/2010 | Kumar et al. | 707/736 |
| 2010/0177877 A1* | 7/2010 | Hamaker et al. | 379/88.14 |
| 2011/0013756 A1* | 1/2011 | Davies et al. | 379/88.14 |
| 2011/0117893 A1* | 5/2011 | Sutton | H04M 3/42382 455/414.1 |
| 2011/0131207 A1* | 6/2011 | Jonsson | 707/730 |
| 2011/0131221 A1* | 6/2011 | Bhide et al. | 707/755 |
| 2011/0274260 A1* | 11/2011 | Vaananen | 379/93.23 |
| 2011/0276396 A1* | 11/2011 | Rathod | 705/14.49 |
| 2012/0079099 A1* | 3/2012 | Dhara et al. | 709/224 |
| 2012/0129505 A1* | 5/2012 | Farkas et al. | 455/414.1 |
| 2012/0151380 A1* | 6/2012 | Bishop | 715/752 |
| 2012/0198355 A1* | 8/2012 | Lau et al. | 715/752 |
| 2012/0330993 A1* | 12/2012 | Faiman et al. | 707/769 |

FOREIGN PATENT DOCUMENTS

| | | |
|---|---|---|
| JP | 2010-277036 A | 12/2010 |
| JP | 2011-087005 A | 4/2011 |

\* cited by examiner

APPARATUS, METHOD AND PROGRAM TO FACILITATE RETRIEVAL OF VOICE MESSAGES

CROSS-REFERENCE TO RELATED APPLICATION

The present application claims priority from Japanese Patent Application No. JP 2011-152712 filed in the Japanese Patent Office on Jul. 11, 2011, the entire content of which is incorporated herein by reference.

BACKGROUND

The present disclosure relates to an information processing apparatus capable of retrieving and displaying voice information based on a character string, and to an information processing method and a program for the information processing apparatus.

From the past, there has been known a technique of retrieving, based on a keyword input by a user, voice information including a voice representing the keyword. For example, Japanese Patent Application Laid-open No. 2010-277036 discloses a technique of collating an input search character string with voice data, calculating a likelihood of the voice data with respect to the search character string, and outputting candidates of the voice data in a higher likelihood order.

Further, Japanese Patent Application Laid-open No. 2011-087005 (hereinafter, referred to as Patent Document 2) discloses a technique of performing voice recognition processing on a voice call to extract a text, and deleting a redundant part of the text to convert the resultant text into a summary text, which is to be displayed together with call history information.

SUMMARY

In the technique disclosed in Patent Document 2, a user grasps contents of a past call by viewing the summary text. Since the summary text has a certain length, however, it takes time to grasp the contents thereof.

In view of the circumstances as described above, it is desirable to provide an information processing apparatus, an information processing method, and a program that allow a user to grasp contents of retrieved voice information more easily.

According to an embodiment of the present disclosure, there is provided an information processing apparatus including a display, an input unit, and a controller. The input unit is configured to receive an input of a first keyword from a user. The controller is configured to retrieve first character information including the input first keyword from a database configured to store a plurality of character information items converted from a plurality of voice information items by voice recognition processing. Further, the controller is configured to extract a second keyword that is included in the first character information acquired by the retrieval and is different from the first keyword. Furthermore, the controller is configured to control the display to display a list of items including first identification information with which the acquired first character information is identified and the second keyword included in the first character information.

With this configuration, the information processing apparatus retrieves a voice information item including a keyword input by a user, and when displaying a list of results of the retrieval, displays other keywords included in the voice information item, with the result that the user is allowed to easily grasp contents of the retrieved voice information item. This is effective in the case where a display area of the display is small, and all contents of the voice information item are not displayed as results of the retrieval. In this case, the first keyword may be input as a character string or as a voice. In addition, the voice information refers to information in which voice calls are recorded, for example, but it is not limited thereto. The voice information may be voice data included in video contents. The identification information refers to, for example, a name and a telephone number of a party on the other end of a voice call and a date and time of the call, but it is not limited thereto. The database may be provided in the information processing apparatus or outside of the network (as a server, for example). In other words, the retrieval processing includes a case of searching a database included in the information processing apparatus by the information processing apparatus and a case of requesting an external database (server) to perform a retrieval and receiving its results.

The controller may retrieve, when an operation of the user to select the second keyword included in the displayed items is received, second character information including the second keyword from the database. Further, the controller may extract a third keyword that is included in the second character information acquired by the retrieval and is different from the second keyword. Furthermore, the controller may control the display to display a list of items including second identification information with which the acquired second character information is identified and the third keyword included in the second character information.

With this configuration, the information processing apparatus retrieves another voice information item based on a character string input by the user, with another character string included in the retrieved voice information being used as a key, with the result that voice information items in which the user is interested are successively retrieved, and the user is allowed to grasp contents thereof.

The database may store a plurality of summary information items obtained by summarizing the plurality of character information items. In this case, the controller may acquire, when an operation of the user to select one of the displayed items is received, a summary information item corresponding to the selected item from the database, and control the display to display the acquired summary information item.

With this configuration, the information processing apparatus allows a user to select a displayed item, with the result that the user grasps contents of a voice information item more reliably than the second keyword.

The controller may control the display to display the summary information item in a state where a third keyword included in the summary information item is selectable. Further, the controller may retrieve, when an operation of the user to select the displayed third keyword is received, third character information including the third keyword from the database. Furthermore, the controller may extract a fourth keyword that is included in the third character information acquired by the retrieval and is different from the third keyword. Furthermore, the controller may control the display to display a list of items including third identification information with which the acquired third character information is identified and the fourth keyword included in the third character information.

With this configuration, in the case where a character string included in a summary information item is selected, the information processing apparatus provides a user with a new list of items related to the character string.

The controller may replay, when an operation of the user to designate an arbitrary position of the displayed summary information item is received, one of the plurality of voice information items that corresponds to a character information item as a summary source of the summary information item, from a replay position corresponding to a character string displayed at the designated position.

With this configuration, the information processing apparatus allows a user to designate an arbitrary position of a summary information item, with the result that a voice information item is caused to be replayed from a position corresponding to the arbitrary position, and the user grasp contents of the voice information item without any change.

According to another embodiment of the present disclosure, there is provided an information processing method including receiving an input of a first keyword from a user. First character information including the input first keyword is retrieved from a database configured to store a plurality of character information items converted from a plurality of voice information items by voice recognition processing. A second keyword that is included in the first character information acquired by the retrieval and is different from the first keyword is extracted. A list of items including first identification information with which the acquired first character information is identified and the second keyword included in the first character information is displayed.

According to still another embodiment of the present disclosure, there is provided a program causing an information processing apparatus to execute the steps of: receiving an input of a first keyword from a user; retrieving first character information including the input first keyword from a database configured to store a plurality of character information items converted from a plurality of voice information items by voice recognition processing; extracting a second keyword that is included in the first character information acquired by the retrieval and is different from the first keyword; and displaying a list of items including first identification information with which the acquired first character information is identified and the second keyword included in the first character information.

As described above, according to the present disclosure, a user is allowed to grasp contents of retrieved voice information more easily.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.
[Outline of System]

Figure 1:
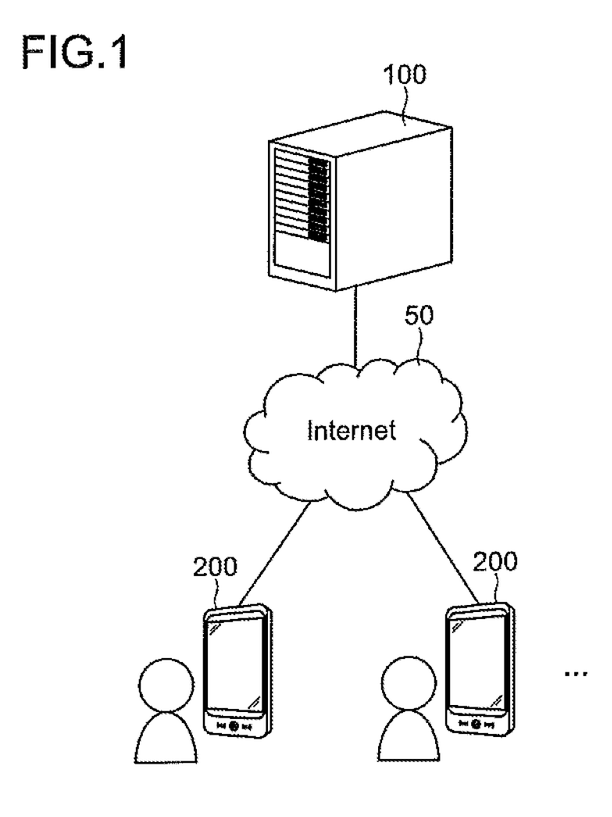
FIG. 1 is a diagram showing an outline of a call history retrieval system according to an embodiment of the present disclosure.

FIG. 1 is a diagram showing an outline of a configuration of a voice call history retrieval system according to an embodiment of the present disclosure.

As shown in FIG. 1, this system is constituted of a server 100 and a user terminal 200. The server 100 and the user terminal 200 communicate with each other through a network such as the Internet 50.

A plurality of user terminals 200 may exist on the network. The user terminals 200 are typically mobile terminals such as a smartphone, a mobile phone, and a tablet PC (Personal Computer), but may be any information processing apparatuses including desktop and laptop PCs, an electronic book reader, portable A/V (audio/visual) equipment, and the like.

A user of the user terminal 200 makes a voice call to a user of another user terminal with use of the user terminal 200. This voice call data is stored in the user terminal 200 as a call history.

The server 100 acquires the voice call data from the user terminal 200, and converts the voice call data into character information by voice recognition processing and then store it.

The user terminal 200 retrieves past voice calls via the server 100 based on a keyword input by the user and displays results of the retrieval.
[Hardware Configuration of Server]

Figure 2:
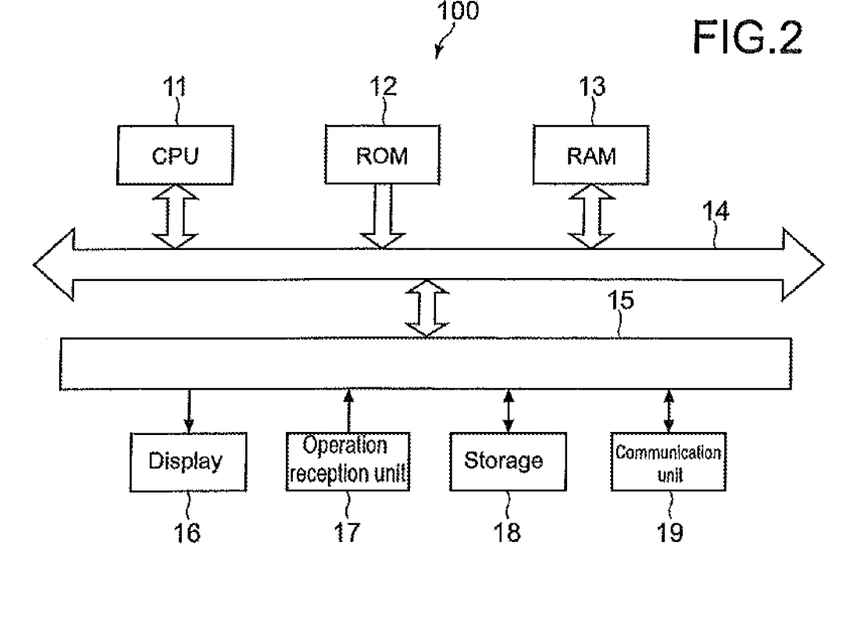
FIG. 2 is a block diagram showing a configuration of a server in the call history retrieval system.

FIG. 2 is a diagram showing a hardware configuration of the server 100. As shown in FIG. 2, the server 100 includes a CPU (Central Processing Unit) 11, a ROM (Read Only Memory) 12, a RAM (Random Access Memory) 13, an input and output interface 15, and a bus 14 that connects those above components to one another.

The CPU 11 accesses the RAM 13 and the like when necessary and performs overall control on the respective blocks of the server 100 while performing various types of computation processing. The ROM 12 is a non-volatile memory in which an OS to be executed by the CPU 11 and firmware such as programs and various parameters are fixedly stored. The RAM 13 is used as a work area or the like of the CPU 11 and temporarily stores the OS, various applications in execution, and various types of data being processed.

Connected to the input and output interface 15 are a display 16, an operation reception unit 17, a storage 18, a communication unit 19, and the like.

The display 16 is a display device using, for example, an LCD (Liquid Crystal Display), an GELD (Organic Electroluminescent Display), a CRT (Cathode Ray Tube), or the like.

The operation reception unit 17 includes a pointing device such as a mouse, a keyboard, a touch panel, and other input devices. In the case where the operation reception unit 17 is a touch panel, the touch panel may be formed integrally with the display 16.

The storage 18 is a non-volatile memory such as an HDD (Hard Disk Drive), a flash memory (SSD (Solid State Drive)), and other solid-state memories. The storage 18 stores the OS, various applications, and various types of data. In particular, in this embodiment, the storage 18 stores voice call data received from the user terminal 200 and character data obtained by performing voice recognition processing on the voice call data.

The communication unit 19 is a NIC (Network Interface Card) or the like for wired connection to the Internet 50 or a LAN (Local Area Network), and performs communication processing with the user terminal 200.

[Hardware Configuration of User Terminal]

Figure 3:
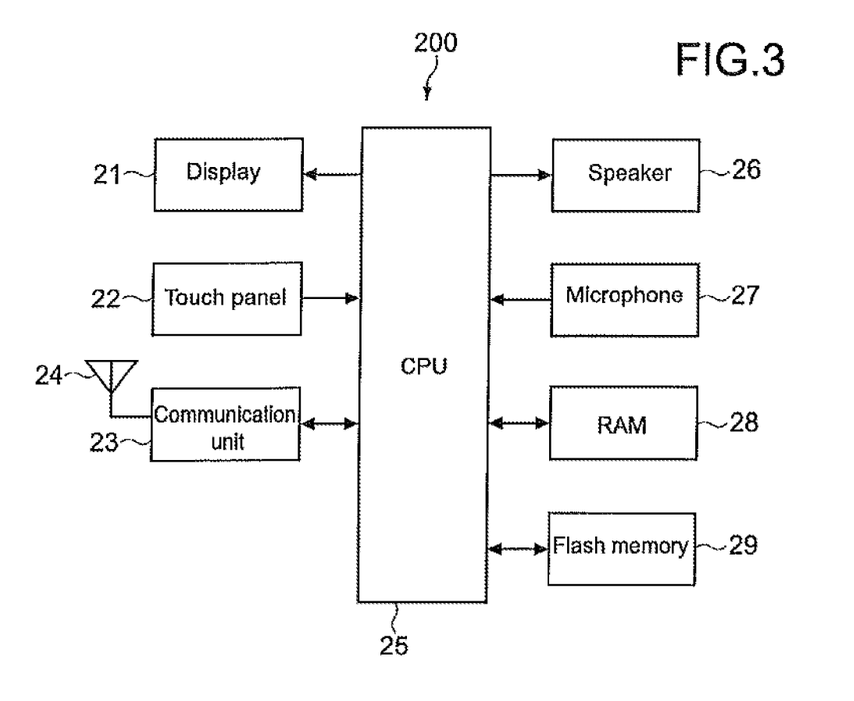
FIG. 3 is a block diagram showing a configuration of a user terminal in the call history retrieval system.

FIG. 3 is a diagram showing a hardware configuration of the user terminal 200. As shown in FIG. 3, the user terminal 200 includes a display 21, a touch panel 22, a communication unit 23, an antenna 24, a CPU 25, a speaker 26, a microphone 27, a RAM 28, and a flash memory 29.

The display 21 is constituted of, for example, a liquid crystal display, an EL (Electroluminescent) display, or the like. The display 21 is formed integrally with the touch panel 22. Examples of the touch panel 22 include a resistive touch panel and a capacitive touch panel, but the touch panel may have any system. On the display 21 (touch panel 22), a list of history information of past voice calls is displayed, which will be described later.

The communication unit 23 executes processing such as frequency transform, modulation, and demodulation of radio waves that are transmitted and received by the antenna 24. The antenna 24 transmits and receives radio waves for calls and packet communication of e-mail and the like. Further, the communication unit 23 is also used when voice call data is transmitted to the server 100.

The speaker 26 includes a digital/analog converter, an amplifier, and the like. The speaker 26 executes digital/analog conversion processing and amplification processing on voice call data input from the CPU 25 and outputs a voice via a receiver (not shown).

The microphone 27 includes an analog/digital converter and the like. The microphone 27 converts analog voice data that has been input from the user through a microphone into digital voice data and outputs it to the CPU 25. The digital voice data output to the CPU 25 is encoded and then transmitted via the communication unit 23 and the antenna 24.

The RAM 28 is a volatile memory used as a work area of the CPU 25. The RAM 28 temporarily stores various program and various types of data used for processing of the CPU 25.

The flash memory 29 is a non-volatile memory in which various programs and various types of data necessary for processing of the CPU 25 are stored. In particular, in this embodiment, the flash memory 29 stores applications and data for displaying a list of the call history and the voice call data.

The CPU 25 performs overall control on the respective units of the user terminal 200 and executes various computations according to various programs. For example, the CPU 25 exchanges data with the server 100 to execute processing of retrieving voice call data based on a character string (keyword) input through the touch panel 22, and displays results of the retrieval on the display 21.

[Software Configurations of Server and User Terminal]

Figure 4:
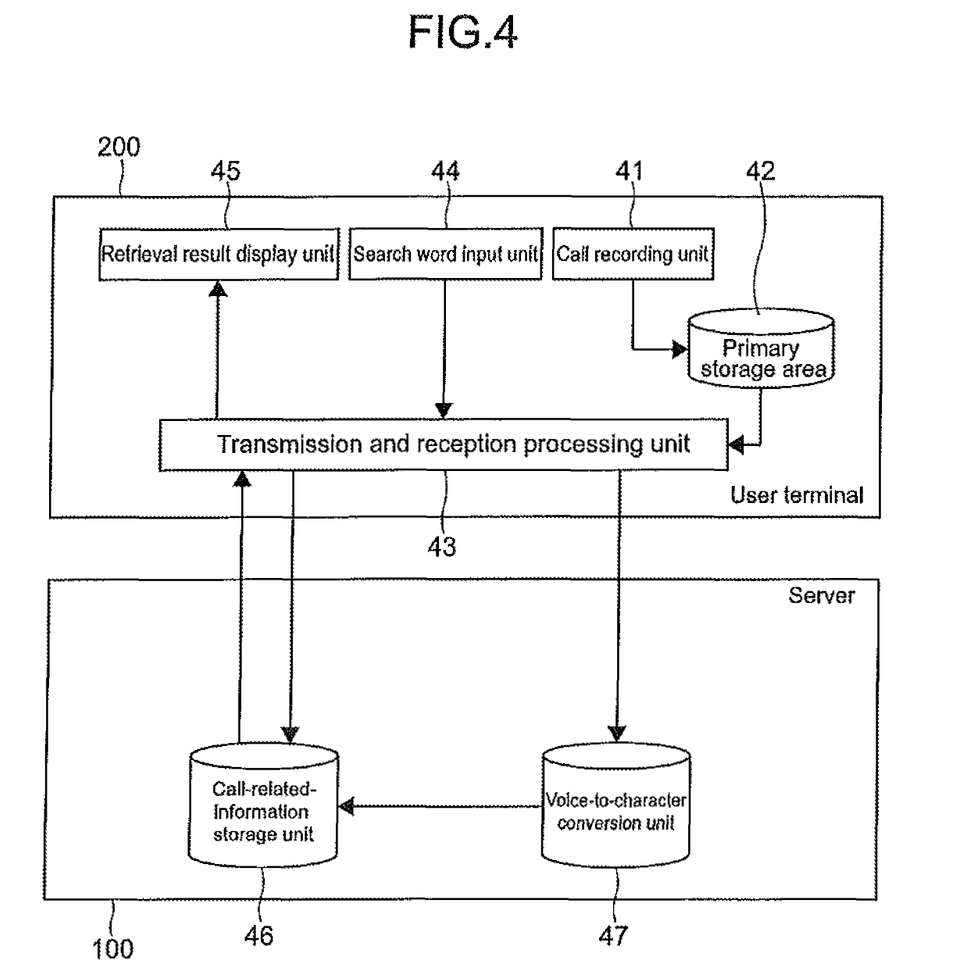
FIG. 4 is a functional block diagram showing a software configuration of the user terminal and that of the server.

FIG. 4 is a block diagram showing a configuration of a function (software) provided to each of the server 100 and the user terminal 200.

As shown in FIG. 4, the user terminal 200 includes a call recording unit 41, a primary storage area 42, a transmission and reception processing unit 43, a search word input unit 44, and a retrieval result display unit 45. Further, the server 100 includes a call-related-information storage unit 46 and a voice-to-character conversion unit 47.

The call recording unit 41 stores voice call data of the user in the primary storage area 42.

The transmission and reception processing unit 43 transmits the voice call data stored in the primary storage area 42 to the call-related-information storage unit 46 of the server 100 and notifies the voice-to-character conversion unit 47 of the fact that the voice call data has been transmitted.

The call-related-information storage unit 46 stores the voice call data transmitted from the transmission and reception processing unit 43.

The voice-to-character conversion unit 47 executes voice recognition processing on the received voice call data to convert the voice call data into character data. The converted character data is stored in the call-related-information storage unit 46.

The search word input unit 44 receives an input of a search keyword from the user.

The retrieval result display unit 45 displays, on the display 21, a list of voice call data retrieved from the call-related-information storage unit 46 based on the search keyword.

[Operations of Server and User Terminal]

Next, operations of the server 100 and user terminal 200 configured as described above will be described. Hereinafter, descriptions will be given on the assumption that the CPU 11 of the server 100 and the CPU 25 of the user terminal 200 are subjects of operations. However, those operations are also executed in cooperation with other hardware and software (application) provided to the server 100 and the user terminal 200.

Figure 5:
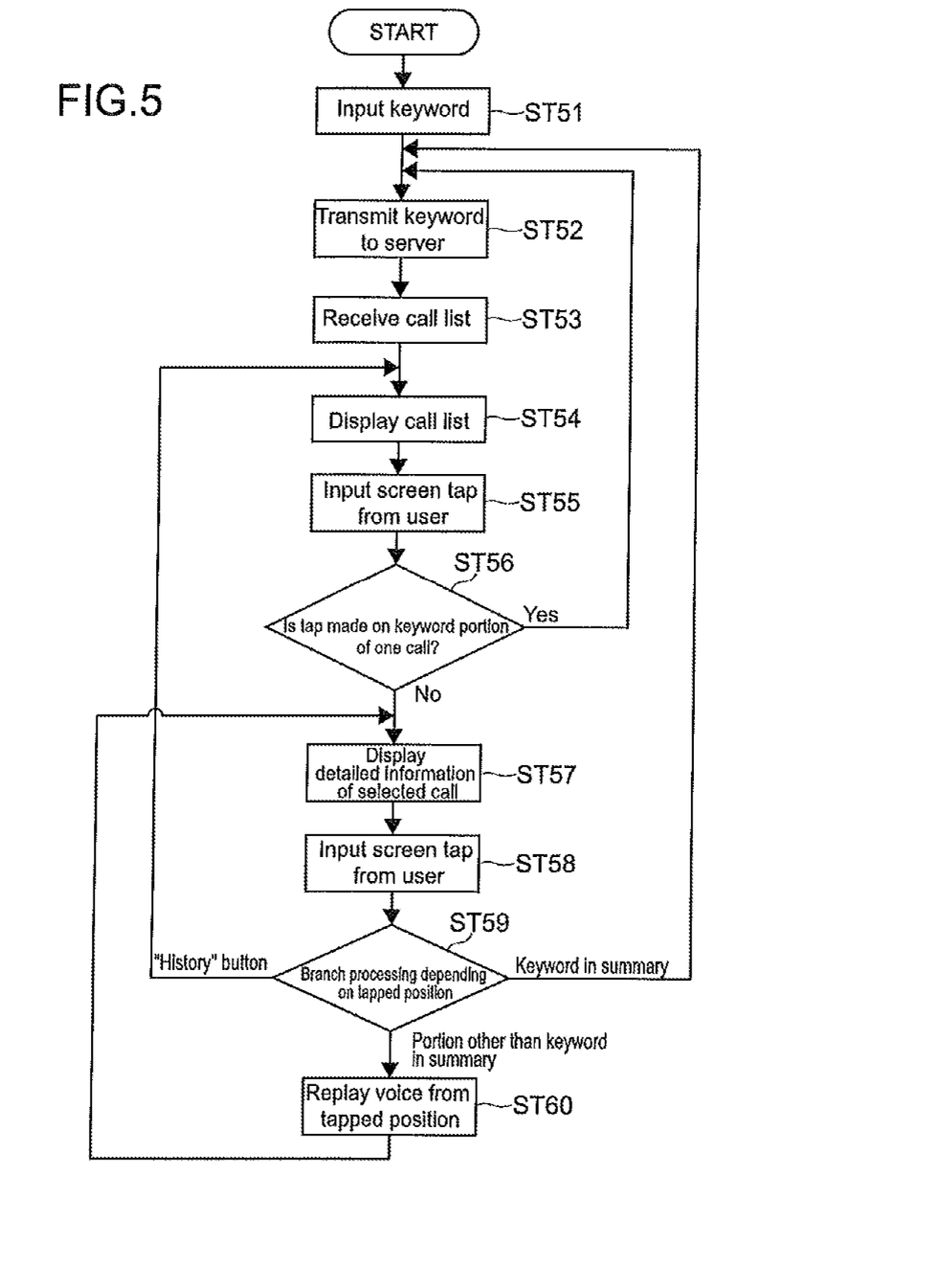
FIG. 5 is a flowchart showing an operation procedure of the user terminal in processing of retrieving voice call data based on a keyword.

FIG. 5 is a flowchart showing an operation procedure of the user terminal 200 in processing of retrieving voice call data based on a keyword. Further, FIG. 6 is a flowchart showing an operation procedure of the server 100 in the retrieval processing.

As shown in FIG. 5, the CPU 25 of the user terminal 200 first receives an input of a keyword from the user (Step 51). The keyword is input in, for example, a box displayed on the display 21 by the user using a keyboard (including software keyboard). Here, the keyword may be input by a voice of the user via the microphone 27.

Subsequently, the CPU 25 transmits the input keyword to the server 100 (Step 52). In the case where the keyword is input by a voice, voice data thereof is transmitted to the server 100.

Figure 6:
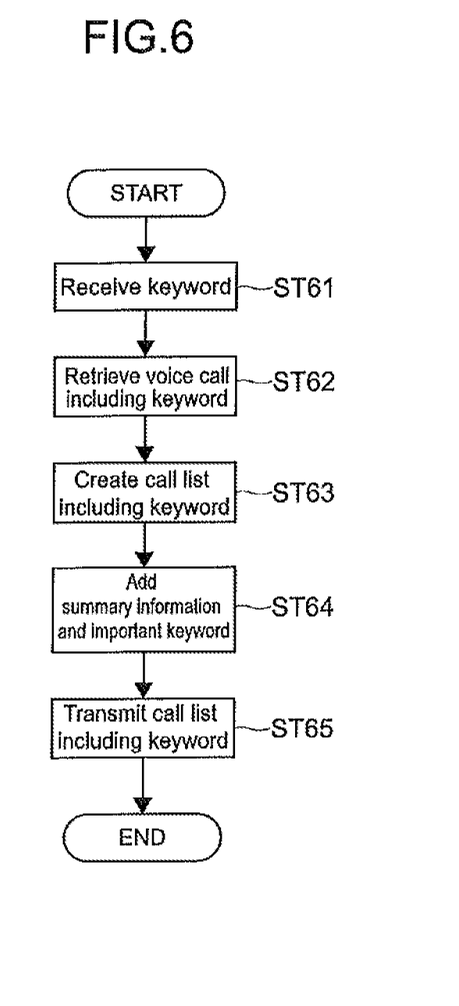
FIG. 6 is a flowchart showing an operation procedure of the server in the processing of retrieving voice call data based on a keyword.

Meanwhile, as shown in FIG. 6, upon reception of the keyword from the user terminal 200 (Step 61), the CPU 11 of the server 100 retrieves voice call data including the keyword from the call-related-information storage unit 46 (Step 62). Here, in the case where the keyword transmitted from the user terminal 200 is voice data, the CPU 11 converts the voice data into a character string by the voice-to-character conversion unit 47 and then executes a retrieval.

Then, the CPU 11 creates, based on results of the retrieval, a list of voice call data including the keyword (Step 63). In this case, the CPU 11 extracts summary information and an important keyword from the call-related-information storage unit 46. The summary information is a summary of contents of character information obtained by converting voice call data items into characters. The important keyword is included in the character information. Then, the CPU 11 adds the extracted summary information and important keyword to a list of the retrieved voice call data (Step 64). The summary information and the important keyword will be described later in detail.

The CPU 11 then transmits the list to the user terminal 200 (Step 65).

Meanwhile, as shown in FIG. 5, upon reception of the list of voice call data from the server 100 (Step 53), the CPU 25 of the user terminal 200 displays the list on the display 21 as results of the retrieval of a voice call history based on the keyword (Step 54).

Figure 7:
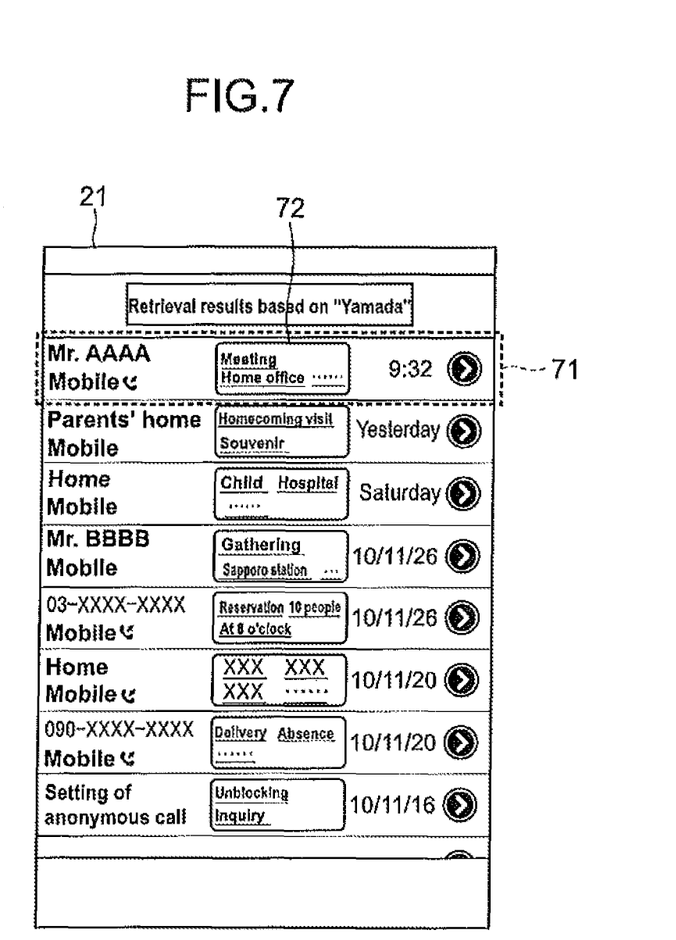
FIG. 7 is a diagram showing an example of a display screen showing retrieval results of voice calls.

FIG. 7 is a diagram showing an example of a display screen showing the retrieval results of the voice call history.

As shown in FIG. 7, on the retrieval result display screen, voice call data items 71 for identifying voice call data retrieved based on the keyword are displayed as a list. In the voice call data items 71, for example, a name (registered name) and a telephone number of a party on the other end of that voice call and a date and time of the call are displayed. For example, the voice call data items 71 may be displayed in earlier order of a date and time of a call or in higher order of the number of included keywords.

In addition, in each of the voice call data items 71, an important keyword 72 that is different from the search keyword described above and is included in the voice call data is displayed.

The important keyword 72 is, for example, a noun that has been extracted by the voice-to-character conversion unit 47 from the voice call data converted into characters, in morphological analysis processing or the like. The important keyword 72 is underlined in order to indicate that the underlined important keyword 72 is selectable (capable of receiving tap operation, for example).

Referring back to FIG. 5, when receiving an input of a tap operation from the user on the display 21 (touch panel 22) (Step 55), the CPU 25 determines whether the tap is made on a portion corresponding to the important keyword 72 within one of the voice call data items 71 (Step 56).

When determining that the tap is made on a portion corresponding to the important keyword 72 (Yes), the CPU 25 executes the retrieval processing performed in Step 52 and subsequent steps with that important keyword 72 as a new search keyword and displays as results of the retrieval a new list of voice call data, which is received from the server 100, in the same manner as that shown in FIG. 7.

When determining that the tap is not made on a portion corresponding to the important keyword 72 (No), that is, that the tap is an operation to select a specific one of the voice call data items 71, the CPU 25 displays detailed information of the selected voice call data item (Step 57).

Figure 8:
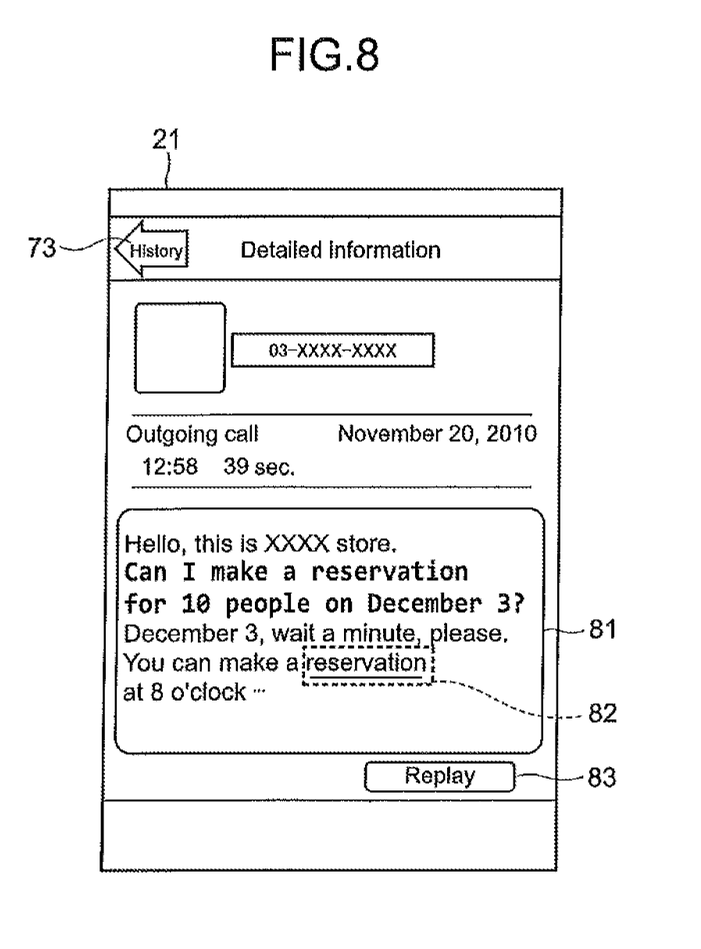
FIG. 8 is a diagram showing an example of a display screen showing detailed information of a voice call selected from the retrieval results.

FIG. 8 is a diagram showing an example of a display screen showing detailed information of voice call data.

As shown in FIG. 8, on the detailed information display screen, summary information 81 of character information obtained by converting the selected voice call data is displayed in addition to a telephone number and an image of a party on the other end (in the case of being registered), a date and time of a call, a total talk time, and information indicative of an outgoing or incoming call.

The summary information 81 is created by the voice-to-character conversion unit 47 based on the character information stored in the call-related-information storage unit 46 and stored in the call-related-information storage unit 46. The summary information 81 is received simultaneously when a list of voice call data is received from the server 100. The summary information 81 may be crated by any method, but it is created by combining clauses including a specific noun in the character information with one another, for example.

In the summary information 81, the character information is displayed while distinguishing speakers by different colors, fonts, and the like. Such differentiation of speakers is executed by the voice-to-character conversion unit 47 in advance and added as metadata. Such differentiation is executed by a comparison with a voice feature (acoustic pattern) such as a waveform of voice call data as a source. Alternatively, each speaker may be indicated by characters or the like in each sentence within the summary information 81.

Further, in the summary information 81, an important keyword 82 included therein is displayed in a selectable state. The important keyword 82 corresponds to the important keyword 72 displayed on the above-mentioned retrieval result display screen.

Furthermore, a replay button 83 is also displayed on the display screen showing detailed information. Although not described in the flowchart of FIG. 5, the voice call data as a source is replayed from the beginning in response to a press of the replay button 83. Accordingly, even if the character information has a conversion error, the user may conform the error. Moreover, a history button 73 for returning (transferring) to the retrieval result display screen is also displayed on, for example, an upper left portion of the detailed information display screen.

Referring back to FIG. 5, when receiving an input of a tap operation from the user on the detailed information display screen (Step 58), the CPU 25 executes different processing depending on a position of the tap operation (Step 59).

Specifically, when determining that the position of the tap operation (tapped position) is on a portion corresponding to the important keyword 82 in the summary information 81, the CPU 25 executes the retrieval processing performed in Step 52 and subsequent steps with that important keyword 82 as a new search keyword. Then, the CPU 25 displays as results of the retrieval a new list of voice call data, which is received from the server 100, in the same manner as that shown in FIG. 7.

Further, when determining that the tapped position is on a portion other than the important keyword 82 in the summary information 81, the CPU 25 replays the voice call data from a position corresponding to a character string displayed at the tapped position. For example, by receiving correspondence information between character strings in the summary information 81 and replay positions in the voice call data in advance together with the summary information 81 and the like from the server 100, the CPU 25 distinguishes a character string displayed at the tapped position.

Further, when determining that the tapped position is on the history button 73, the CPU 25 displays again the retrieval result display screen shown in FIG. 7.

[Conclusion]

As described above, according to this embodiment, the user terminal 200 cooperates with the server 100 to retrieve voice call data based on a keyword input by the user, and when results of the retrieval are displayed as a list, the user terminal 200 also display the important keyword 72 other than the search keyword. Accordingly, the user easily grasp contents of voice call data based on a relationship between the keyword input by the user and the important keyword 71.

Modified Example

The present disclosure is not limited to the embodiment described above and may variously be modified without departing from the gist of the present disclosure.

In the embodiment described above, a target to be retrieved is the voice call data, but it is not limited thereto.

For example, music data, voice data in moving image contents, and the like may be targets to be retrieved.

In the embodiment described above, the server 100 performs the processing of converting voice call data into characters and the processing of storing the voice call data and character information obtained by conversion of the voice call data. In the case where the user terminal 200 has a sufficiently storage capacity and calculation capability, however, the processing performed by the server 100 may be executed by the user terminal 200.

In the embodiment described above, the user terminal 200 makes a voice call and then temporarily stores voice call data thereof to transmit it to the server 100. However, an apparatus for making a voice call may be an apparatus different from the user terminal 200. In this case, the user terminal 200 receives voice call data from the apparatus that has made a voice call via a network for example, or stores voice call data received via a recording medium.

The layout of the user interface of the retrieval result display screen shown in FIG. 7 and the detailed information display screen shown in FIG. 8 are not limited to those illustrated in the figures, and various layouts may be used.

In the embodiment described above, the present disclosure is applied to the user terminal 200. However, the present disclosure is applicable to an audio player, a television apparatus, a game device, a car navigation apparatus, a recording and reproducing apparatus, and any other information processing apparatuses.

[Others]

It should be noted that the present disclosure may take the following configurations.

(1) An information processing apparatus, including:
a display;
an input unit configured to receive an input of a first keyword from a user; and
a controller configured to
retrieve first character information including the input first keyword from a database configured to store a plurality of character information items converted from a plurality of voice information items by voice recognition processing,
extract a second keyword that is included in the first character information acquired by the retrieval and is different from the first keyword, and
control the display to display a list of items including first identification information with which the acquired first character information is identified and the second keyword included in the first character information.

(2) The information processing apparatus according to Item (1), in which
the controller
retrieves, when an operation of the user to select the second keyword included in the displayed items is received, second character information including the second keyword from the database,
extracts a third keyword that is included in the second character information acquired by the retrieval and is different from the second keyword, and
controls the display to display a list of items including second identification information with which the acquired second character information is identified and the third keyword included in the second character information.

(3) The information processing apparatus according to Item (1) or (2), in which the database stores a plurality of summary information items obtained by summarizing the plurality of character information items, and
the controller
acquires, when an operation of the user to select one of the displayed items is received, a summary information item corresponding to the selected item from the database, and
controls the display to display the acquired summary information item.

(4) The information processing apparatus according to Item (3), in which
the controller
controls the display to display the summary information item in a state where a third keyword included in the summary information item is selectable,
retrieves, when an operation of the user to select the displayed third keyword is received, third character information including the third keyword from the database,
extracts a fourth keyword that is included in the third character information acquired by the retrieval and is different from the third keyword, and
controls the display to display a list of items including third identification information with which the acquired third character information is identified and the fourth keyword included in the third character information.

(5) The information processing apparatus according to Item (3) or (4), in which
the controller replays, when an operation of the user to designate an arbitrary position of the displayed summary information item is received, one of the plurality of voice information items that corresponds to a character information item as a summary source of the summary information item, from a replay position corresponding to a character string displayed at the designated position.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a display;
an input device to receive a first user input of a first keyword inputted by a user in a portion of a graphical user interface; and
a processor configured to:
receive voice call data and store the voice call data in a local memory;
transmit the stored voice call data to a server, wherein the server converts the voice call data to a voice call character string;
cause a first query of the server to be performed using the first keyword of the first user input, wherein the first query retrieves first character information associated with the first keyword, and in response to the first query, cause a first list of data items associated with the first character information to be displayed on the display;
receive a second user input on a data item in the list of data items, wherein the second user input causes the voice call character string to be displayed, wherein the voice call character string includes a second keyword extracted from the voice call character string, and wherein a visual indication of the second keyword is displayed; and receive a third user input on the voice call character string, and determine a selected position of the third user input on the voice call character string, and determine whether or not the selected position of the third user input on the voice call character string displayed on the display is of the extracted second keyword, and (a) when a determination result thereof indicates that the selected position on the voice call character string is one other than that of the second keyword, cause the voice call data to be played from a playback position corresponding to the selected position on the voice call character string displayed on the display, and (b) when the determination result thereof indicates that the selected position on the voice call character string is that of the second keyword or the visual indication thereof, cause a second query to be performed using the second keyword, wherein the second query retrieves second character information associated with the second keyword from the server without causing the voice call data to be played from the position corresponding to the selected position on the voice call character string displayed on the display, wherein the second character information is used to present a second list of data items associated with the second character information to be displayed on the display.

2. An information processing method for use with a processing apparatus, said method comprising:

receiving a first user input of a first keyword inputted by a user in a portion of a graphical user interface; and causing, by use of a processor of the processing apparatus, voice call data of the user to be stored in a local memory, the stored voice call data of the user to be transmitted to a server, wherein the server converts the voice call data to a voice call character string, a first query of the server to be performed using the first keyword of the first user input, wherein the first query retrieves first character information associated with the first keyword, and in response to the first query, causing a first list of data items associated with the first character information to be displayed on a display;

a receiving of a second user input on a data item in the list of data items, wherein the second user input causes the voice call character string to be displayed on the display, wherein the voice call character string includes a second keyword extracted from the voice call character string, and wherein a visual indication of the second keyword is displayed on the display; and a receiving of a third user input on the voice call character string, and a determining of a selected position of the third user input on the voice call character string, and a determining of whether or not the selected position of the third user input on the voice call character string displayed on the display is of the extracted second keyword, and (a) when the determining result thereof indicates that the selected position on the voice call character string is one other than that of the second keyword, causing the voice call data to be played from a playback position corresponding to the selected position on the voice call character string displayed on the display, and (b) when the determining result thereof indicates that the selected position on the voice call character string is that of the second keyword or the visual indication thereof, causing a second query to be performed using the second keyword, wherein the second query retrieves second character information associated with the second keyword from the server without causing the voice call data to be played from the position corresponding to the selected position on the voice call character string displayed on the display, wherein the second character information is used to present a second list of data items associated with the second character information to be displayed on the display.

3. A non-transitory computer readable storage medium having stored thereon a program causing an information processing apparatus to execute the steps of:

receiving a first user input of a first keyword inputted by a user in a portion of a graphical user interface; and causing, by use of a processor of the information processing apparatus, voice call data of the user to be stored in a local memory, the stored voice call data of the user to be transmitted to a server, wherein the server converts the voice call data to a voice call character string, a first query of the server to be performed using the first keyword of the first user input, wherein the first query retrieves first character information associated with the first keyword, and in response to the first query, causing a first list of data items associated with the first character information to be displayed on a display;

a receiving of a second user input on a data item in the list of data items, wherein the second user input causes the voice call character string to be displayed on the display, wherein the voice call character string includes a second keyword extracted from the voice call character string, and wherein a visual indication of the second keyword is displayed on the display; and a receiving of a third user input on the voice call character string, and a determining of a selected position of the third user input on the voice call character string, and a determining of whether or not the selected position of the third user input on the voice call character string displayed on the display is of the extracted second keyword, and (a) when the determining result thereof indicates that the selected position on the voice call character string is one other than that of the second keyword, causing the voice call data to be played from a playback position corresponding to the selected position on the voice call character string displayed on the display, and (b) when the determination determining result thereof indicates that the selected position on the voice call character string is that of the second keyword or the visual indication thereof, causing a second query to be performed using the second keyword, wherein the second query retrieves second character information associated with the second keyword from the server without causing the voice call data to be played from the position corresponding to the selected position on the voice call character string displayed on the display, wherein the second character information is used to present a second list of data items associated with the second character information to be displayed on the display.

* * * * *